United States Patent
Kim et al.

(10) Patent No.: US 8,654,077 B2
(45) Date of Patent: Feb. 18, 2014

(54) APPARATUS AND METHOD FOR DETECTING TAP

(75) Inventors: Kyung Rin Kim, Gyeonggi-do (KR);
Byoung Won Hwang, Gyeonggi-do (KR); Chang Hyun Kim, Gyeonggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 160 days.

(21) Appl. No.: 13/409,698

(22) Filed: Mar. 1, 2012

(65) Prior Publication Data
US 2013/0147709 A1   Jun. 13, 2013

(30) Foreign Application Priority Data
Dec. 12, 2011   (KR) .................. 10-2011-0132889

(51) Int. Cl.
*G06F 3/033*   (2013.01)
*G09G 5/08*   (2006.01)

(52) U.S. Cl.
USPC .......................................... 345/158; 345/163

(58) Field of Classification Search
USPC .......................................... 345/156–173, 179
See application file for complete search history.

(56) References Cited

U.S. PATENT DOCUMENTS

| | | |
|---|---|---|
| 2010/0194682 A1 | 8/2010 | Orr et al. |
| 2010/0256947 A1 | 10/2010 | Kim et al. |

FOREIGN PATENT DOCUMENTS

| | | |
|---|---|---|
| JP | 2010-211323 A | 9/2010 |
| KR | 2003-0090089 A | 11/2003 |
| KR | 10-2005-0104529 A | 11/2005 |
| KR | 10-2007-0060580 A | 6/2007 |

OTHER PUBLICATIONS

Korean Notice of Allowance issued in Application No. 10-2011-0132889 dated Jun. 27, 2013.
Korea Office Action for Application No. 10-2011-0132889 dated Mar. 25, 2013.

*Primary Examiner* — Ricardo L Osorio
(74) *Attorney, Agent, or Firm* — McDermott Will & Emery LLP (57) ABSTRACT

Provided is an apparatus and method for detecting a tap. The apparatus includes a sensor configured to detect a motion and output a signal corresponding to the motion, a gradient calculating unit connected to the sensor to calculate a gradient of the output signal from the sensor, a similarity determining unit connected to the gradient calculating unit to determine a similarity between a rising gradient and a falling gradient of a curve of the output signal, a tap determining unit connected to the similarity determining unit to determine detection of a tap according to the determination result of the similarity determining unit, and an output unit configured to output the determination result of the tap determining unit.

21 Claims, 7 Drawing Sheets

FIG. 1A

- PRIOR ART -

FIG. 1B

- PRIOR ART -

FIG. 1C

- PRIOR ART -

FIG. 1D

- PRIOR ART -

APPARATUS AND METHOD FOR DETECTING TAP

CROSS-REFERENCE TO RELATED APPLICATIONS

This application claims the benefit of Korean Patent Application No. 10-2011-0132889 filed with the Korea Intellectual Property Office on Dec. 12, 2011 the disclosure of which is incorporated herein by reference.

BACKGROUND OF THE INVENTION

1. Field of the Invention

The present invention relates to an apparatus and method for detecting a tap.

2. Description of the Related Art

Various sensors are developed that detect the motions of persons or objects electrically or magnetically and output analog signals and/or digital signals.

Examples of these sensors include acceleration sensors, angular velocity sensors, gyro sensors, geomagnetic sensors, and optical sensors, which are based on various principles.

The acceleration sensors, the angular velocity censors, and the gyro sensors are commonly called inertia sensors because they measure inertial force. Recently, technologies are continuously developed that measure an acceleration sensor and an angular velocity sensor simultaneously and apply the measurements to various applications.

Among various functions, the inertia sensors have a function of detecting a tap or click.

Generally, a tap motion may be understood as a motion of shaking a device including an inertia sensor. Like the principle of mouse click input, a tap motion may be processed as a predetermined input value in a host device to which an inertia sensor is connected.

Due to the advent of various mobile devices and mobile device applications, a tap detection function for detecting a tap motion is used as one of the important functions of an inertia sensor.

Patent Document 1 discloses a technology for detecting and determining a tap or a double tap.

However, in detecting a tap, only when the amplitude of a sensor output signal is greater than a predetermined amplitude threshold (A_TH) and the sensor output signal is maintained for more than a predetermined duration threshold (D_TH), the technology of Patent Document 1 determines the occurrence of the tap and outputs the result.

FIGS. 1A to 1D are diagrams illustrating the relationship between a sensor output signal, an amplitude threshold and a duration threshold according to a conventional tap detection condition. The problem of a conventional tap detecting method like that of Patent Document 1 will be described below with reference to FIGS. 1A to 1D.

Figure 1A:
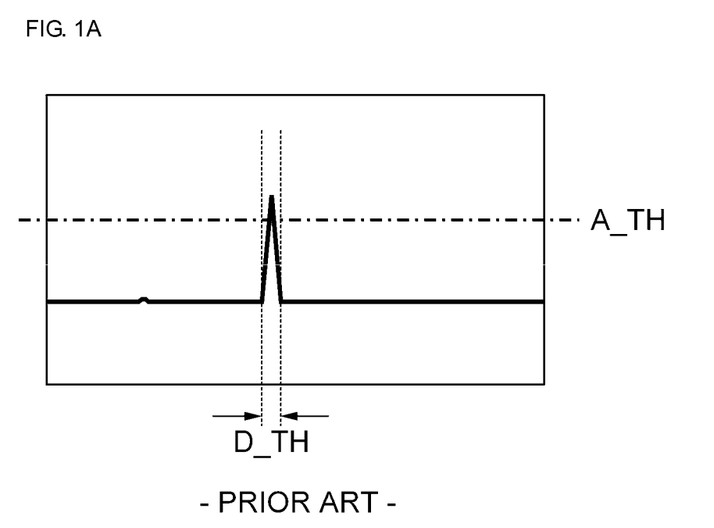

FIG. 1A illustrates the case where a tap is detected when the amplitude threshold condition and the duration threshold condition are satisfied.

Figure 1B:
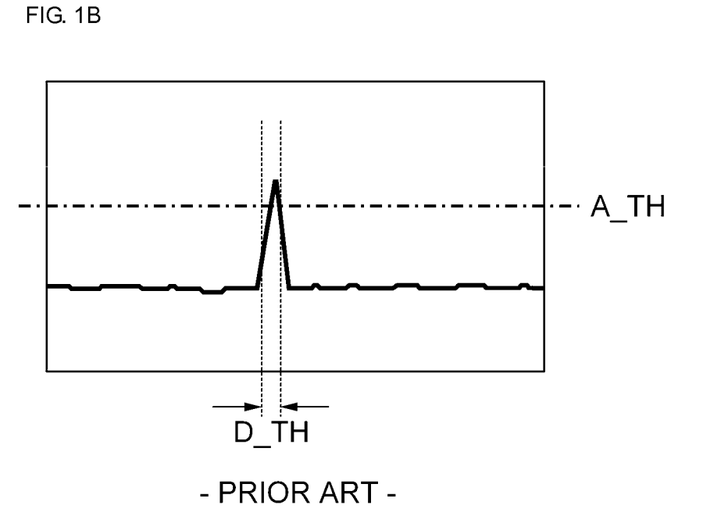
Figure 1C:
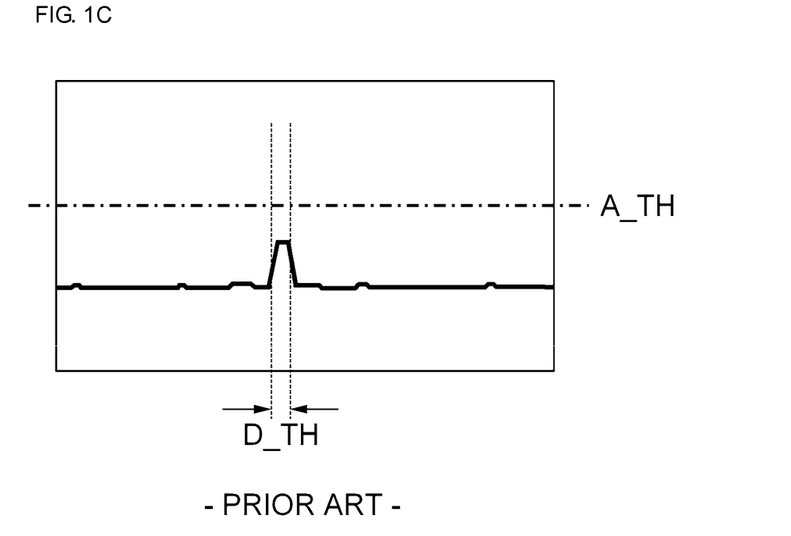
Figure 1D:
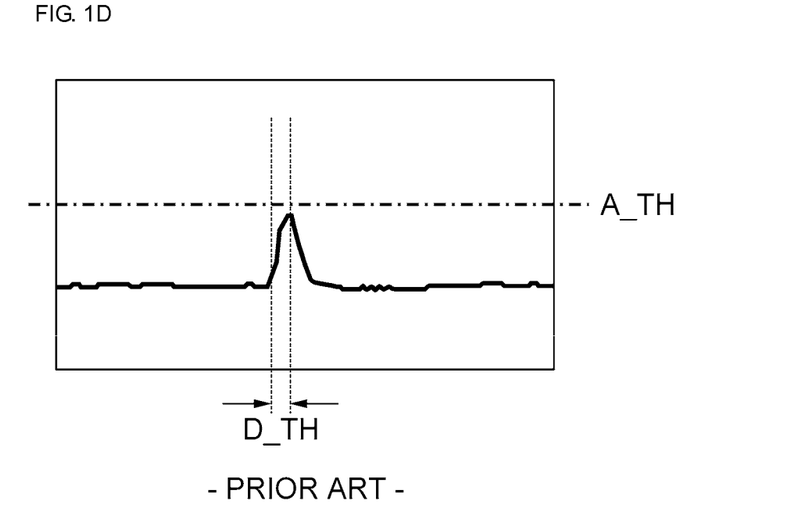

FIG. 1B illustrates the case where the amplitude threshold condition is satisfied but the duration threshold condition are not satisfied. FIG. 1C illustrates the case where the duration threshold condition is satisfied but the amplitude threshold condition is not satisfied. FIG. 1D illustrates the case where the amplitude threshold condition and the duration threshold condition are not satisfied.

Referring to FIGS. 1A to 1D, the conventional tap detecting method has a low detection rate because it fails to detect a tap event in the event of a tap signal because it fixes the amplitude threshold and the duration threshold at predetermined values.

PRIOR ART DOCUMENT

Patent Document

Patent Document 1: US2010/0256947 A1

SUMMARY OF THE INVENTION

The present invention has been invented in order to overcome the above-described problems and it is, therefore, an object of the present invention to provide an apparatus and method for detecting a tap, which can detect a tap by using a common pattern of tap signals.

In accordance with one aspect of the present invention to achieve the object, there is provided an apparatus for detecting a tap, which includes: a sensor configured to detect a motion and output a signal corresponding to the motion; a gradient calculating unit connected to the sensor to calculate a gradient of the output signal from the sensor; a similarity determining unit connected to the gradient calculating unit to determine a similarity between a rising gradient and a falling gradient of a curve of the output signal; a tap determining unit connected to the similarity determining unit to determine detection of a tap according to the determination result of the similarity determining unit; and an output unit configured to output the determination result of the tap determining unit.

The gradient calculating unit may include: a first gradient calculating unit configured to calculate the rising gradient of the output signal; and a second gradient calculating unit configured to calculate the falling gradient of the output signal.

The similarity determining unit may determine that a first gradient calculated by the first gradient calculating unit is similar to a second gradient calculated by the second gradient calculating unit when the ratio of the first gradient to the second gradient is greater than 0.8 and smaller than 1.2.

The gradient calculating unit may calculate an average value by cumulatively summing the difference (Diff) values between the signals outputted from the sensor.

The gradient calculating unit may calculate the $(n+1)^{th}$ difference value $(Diff_{n+1})$ according to an equation $Diff_{n+1} = d_{n+1} - d_n$ where n is a nonnegative integer, and calculate the average value by cumulatively summing the results according to an equation $$\left(\sum_{n=0}^{N-1} Diff_{n+1}\right) / N.$$

The gradient calculating unit may calculate the difference (Diff) values between the signals outputted from the sensor, and select the maximum value among the calculated difference values.

The gradient calculating unit may calculate a gradient $(L(t))$ of the output signal at a certain time (t) according to an equation $$L(t) = \frac{d}{dt} S(t).$$

In accordance with another aspect of the present invention to achieve the object, there is provided an apparatus for detecting a tap, which includes: a sensor configured to detect a motion and output a signal corresponding to the motion; a gradient calculating unit connected to the sensor to calculate a gradient of the output signal from the sensor; a similarity determining unit connected to the gradient calculating unit to determine a similarity between a rising gradient and a falling gradient of a curve of the output signal; an amplitude detecting unit connected to the sensor to detect an amplitude of the output signal; an amplitude comparing unit connected to the amplitude detecting unit to compare the maximum amplitude of the output signal in a first period and the maximum amplitude of the output signal in a second period subsequent to the first period; and a control unit connected to the similarity determining unit and the amplitude comparing unit to determine detection of a tap.

The amplitude detecting unit may include: a first amplitude detecting unit configured to detect the maximum amplitude of the output signal in the first period; and a second amplitude detecting unit configured to detect the maximum amplitude of the output signal in the second period subsequent to the first period.

The amplitude comparing unit may determine whether the ratio of a first amplitude detected by the first amplitude detecting unit to a second amplitude detected by the second amplitude detecting unit is greater or equal to a predetermined reference value, and output the determination result.

Only when the similarity determining unit determines that the rising gradient and the falling gradient are similar to each other, the control unit may determine detection of a tap according to the comparison result of the amplitude comparing unit.

In accordance with another aspect of the present invention to achieve the object, there is provided an apparatus for detecting a tap, which includes: a sensor configured to detect a motion and output a signal corresponding to the motion; a gradient calculating unit connected to the sensor to calculate a gradient of the output signal from the sensor; a similarity determining unit configured to determine a similarity between a rising gradient and a falling gradient of a curve of the output signal; an amplitude detecting unit connected to the sensor to detect amplitudes of the output signal; an amplitude comparing unit connected to the amplitude detecting unit to compare the detected amplitudes; and a control unit connected to the similarity determining unit and the amplitude comparing unit to determine detection of a tap, wherein the control unit determines the double of a duration, in which the similarity determining unit determines that the rising gradient and the falling gradient are similar to each other, as a first period, determines a duration subsequent to the first period as a second period, controls the amplitude comparing unit to determine whether the ratio of the maximum amplitude of the output signal in the first period to the maximum amplitude of the output signal in the second period is greater than or equal to a predetermined reference value, and determines detection of a tap according to the determination result of the amplitude comparing unit.

In accordance with another aspect of the present invention to achieve the object, there is provided a method for detecting a tap, which includes: detecting a motion and outputting a signal corresponding to the motion; calculating a rising gradient and a falling gradient of the output signal; determining a similarity between the rising gradient and the falling gradient of the output signal; and when the rising gradient and the falling gradient are similar to each other, determining detection of a tap and outputting the result.

The determining of the similarity between the rising gradient and the falling gradient of the output signal may determine that the rising gradient and the falling gradient are similar to each other when the ratio of the rising gradient to the falling gradient is greater than 0.8 and smaller than 1.2.

The calculating of the rising gradient and the falling gradient of the output signal may calculate an average value by cumulatively summing the difference (Diff) values between the signals outputted from the sensor.

The calculating of the rising gradient and the falling gradient of the output signal may calculate the $(n+1)^{th}$ difference value $(Diff_{n+1})$ according to an equation $Diff_{n+1} = d_{n+1} - d_n$ where n is a nonnegative integer, and calculates the average value by cumulatively summing the results according to an equation $$\left(\sum_{n=0}^{N-1} Diff_{n+1}\right) / N.$$

The calculating of the rising gradient and the falling gradient of the output signal may calculate the difference (Diff) values between the signals outputted from the sensor, and selects the maximum value among the calculated difference values.

The calculating of the rising gradient and the falling gradient of the output signal may calculate a gradient (L(t)) of the output signal at a certain time (t) according to an equation $$L(t) = \frac{d}{dt} S(t).$$

In accordance with another aspect of the present invention to achieve the object, there is provided a method for detecting a tap, which includes: detecting a motion and outputting a signal corresponding to the motion; calculating a rising gradient and a falling gradient of the output signal; determining a similarity between the rising gradient and the falling gradient of the output signal; determining the double of a duration, in which the rising gradient and the falling gradient are determined to be similar to each other, as a first period, and determining a duration subsequent to the first period as a second period; comparing the ratio of the maximum amplitude of the output signal in the first period to the maximum amplitude of the output signal in the second period with a predetermined reference value; and when the ratio of the maximum amplitude of the output signal in the first period to the maximum amplitude of the output signal in the second period is greater than or equal to the predetermined reference value, determining detection of a tap and outputting the result.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 1A to 1D are diagrams illustrating the relationship between a sensor output signal, an amplitude threshold and a duration threshold according to a conventional tap detection condition, in which FIG. 1A illustrates the case where a tap is detected when the amplitude threshold condition and the duration threshold condition are satisfied, FIG. 1B illustrates the case where the amplitude threshold condition is satisfied but the duration threshold condition are not satisfied, FIG. 1C illustrates the case where the duration threshold condition is satisfied but the amplitude threshold condition is not satisfied, and FIG. 1D illustrates the case where the amplitude threshold condition and the duration threshold condition are not satisfied;

DETAILED DESCRIPTION OF THE PREFERABLE EMBODIMENTS

Exemplary embodiments of the present invention will be described below in detail with reference to the accompanying drawings. Advantages and features of the present invention, and implementation methods thereof will be clarified through the following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals denote like elements throughout the specification and drawings.

The terms used herein are for the purpose of describing the exemplary embodiments only and are not intended to limit the scope of the present invention. As used herein, the singular forms 'a', 'an', and 'the' are intended to include the plural forms as well, unless the context clearly indicates otherwise. It will also be understood that the terms 'comprise', 'include' and 'have' used herein specify the presence of stated components, steps, operations, and/or elements, but do not preclude the presence or addition of one or more other components, steps, operations, and/or elements.

Hereinafter, the configurations and operations of the present invention will be described in detail with reference to the accompanying drawings.

Figure 2:
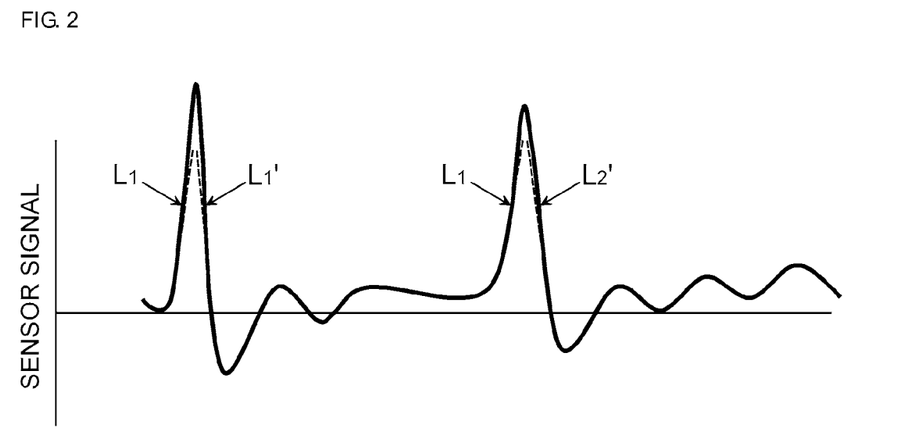
FIG. 2 is a graph illustrating a tap detecting method according to an exemplary embodiment of the present invention.

FIG. 2 is a graph illustrating a tap detecting method according to an exemplary embodiment of the present invention.

Referring to FIG. 2, because a tap motion stops after occurring instantaneously, the waveform of an output signal from a sensor 110 detecting the tap motion takes such a form as illustrated in FIG. 2. That is, the output signal of the sensor 110 rises suddenly at the moment of occurrence of the tap motion and then falls at a similar speed.

The present invention determines the occurrence of a tap by determining the similarity between the rising gradient and the falling gradient of a sensor output signal on the basis of the pattern of the sensor output signal.

Figure 3:
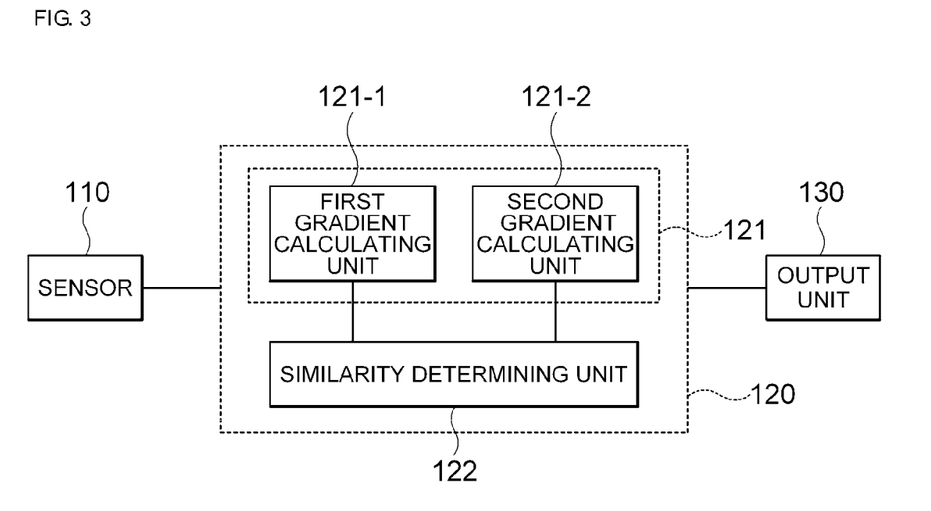
FIG. 3 is a diagram illustrating a tap detecting apparatus according to an exemplary embodiment of the present invention.

FIG. 3 is a diagram illustrating a tap detecting apparatus according to an exemplary embodiment of the present invention.

Referring to FIG. 3, a tap detecting apparatus according to an exemplary embodiment of the present invention may include a sensor 110, a gradient calculating unit 121, a similarity determining unit 122, a tap determining unit 120, and an output unit 130.

The sensor 110 detects a motion outside a device or a motion of a device and generates and outputs a signal corresponding to the detected motion.

The sensor 110 may be implemented using various inertia sensors.

The gradient calculating unit 121 calculates the rising gradient and the falling gradient of an output signal from the sensor 110.

The gradient calculating unit 121 may include a first gradient calculating unit 121-1 for calculating the rising gradient of the sensor output signal and second gradient calculating unit 121-2 for calculating the falling gradient of the sensor output signal.

The similarity determining unit 122 determines the similarity between the rising gradient and the falling gradient of the sensor output signal.

The rising gradient of the sensor output signal calculated by the first gradient calculating unit 121-1 may be defined as a first gradient, and the falling gradient of the sensor output signal calculated by the second gradient calculating unit 121-2 may be defined as a second gradient.

That is, the similarity determining unit 122 may compare the first gradient and the second gradient and determine the similarity therebetween.

When the ratio of the first gradient to the second gradient ranges between 0.8 and 1.2, that is, when the difference between the first gradient and the second gradient is smaller than 20%, it may be determined that the first gradient and the second gradient are similar to each other.

The tap determining unit 120 may determine the detection of a tap according to the determination result of the similarity determining unit 122 and output the determination result through the output unit 130.

Although FIG. 3 illustrates that the tap determining unit 120 includes the gradient calculating unit 121 and the similarity determining unit 122, it will be understood that the gradient calculating unit 121 and the similarity determining unit 122 may be disposed outside the tap determining unit 120.

Figure 4:
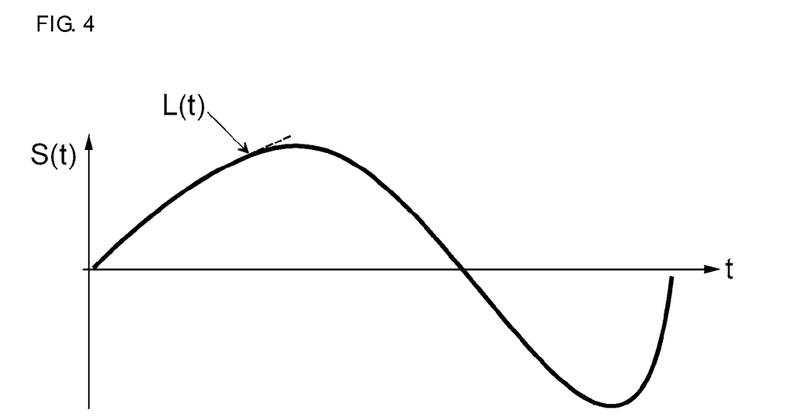
FIG. 4 is a diagram illustrating a gradient calculating method according to an exemplary embodiment of the present invention.

FIG. 4 is a diagram illustrating a gradient calculating method according to an exemplary embodiment of the present invention.

Referring to FIG. 4, a gradient calculating method according to an exemplary embodiment of the present invention may include calculating an instantaneous gradient of the output signal waveform of the sensor 110.

For example, Equation (3) below may be used to calculate the instantaneous change rate at a certain time t, that is, the gradient $L(t)$ of a tangent line to a curve of the sensor output signal at the time t. $S(t)$ denotes the strength of the sensor output signal at the time t, which may be expressed as a kind of function.

$$L(t) = \frac{d}{dt}S(t) \quad (3)$$

Figure 5:
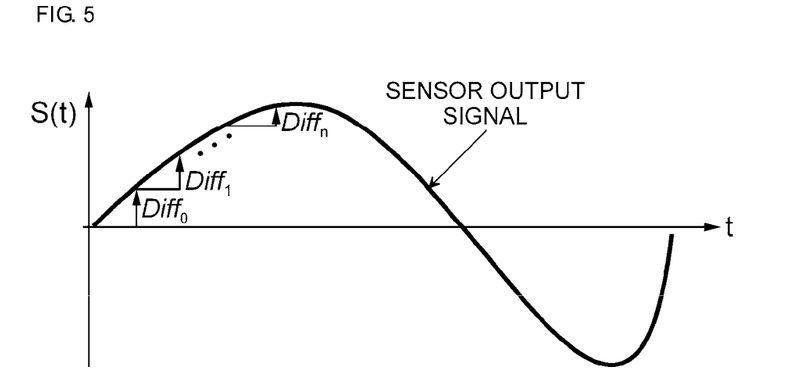
FIG. 5 is a diagram illustrating a gradient calculating method according to another exemplary embodiment of the present invention.

FIG. 5 is a diagram illustrating a gradient calculating method according to another exemplary embodiment of the present invention.

Referring to FIG. 5, a gradient calculating method according to another exemplary embodiment of the present invention may include calculating the difference value Diff between the output signals of the sensor 110 and calculating the cumulative average value of the calculated difference value.

The $(n+1)^{th}$ difference value $\text{Diff}_{n+1}$ may be calculated according to Equation (1) below.

$$\text{Diff}_{n+1} = d_{n+1} - d_n \quad (1)$$

where n is a nonnegative integer (i.e., 0, 1, 2, 3, 4, 5 . . . ).

Also, the cumulative average value may be calculated by calculating the difference value Diff according to Equation (2) below.

$$\left(\sum_{n=0}^{N-1} \text{Diff}_{n+1}\right) / N \quad (2)$$

where N is a nonnegative integer (i.e., 0, 1, 2, 3, 4, 5 . . . ).

Figure 6:
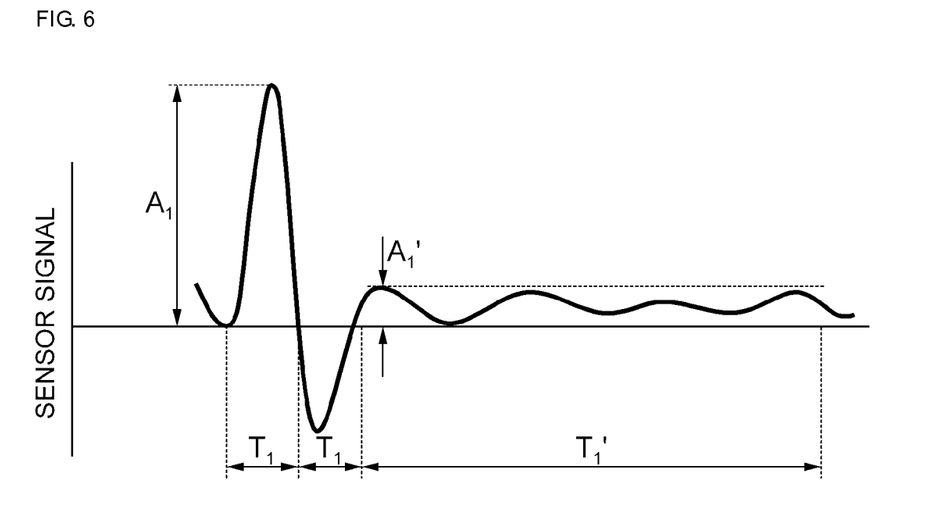
FIG. 6 is a graph illustrating a tap detecting method according to another exemplary embodiment of the present invention.

FIG. 6 is a graph illustrating a tap detecting method according to another exemplary embodiment of the present invention.

Referring to FIG. 6, because a tap motion stops after occurring instantaneously, the waveform of an output signal from a sensor 110 detecting the tap motion takes such a form as illustrated in FIG. 6. That is, the output signal of the sensor 110 rises suddenly at the moment of occurrence of the tap motion, falls below 0 at a similar speed, damps for a predetermined period of time, and then converges to 0. This is because a vibrating component at the sensor 110 disappears after existing at a very small size.

When a tap motion is detected, the waveform of an output signal from the sensor 110 varies widely. This duration may be defined as a first period, and the subsequent duration may be defined as a second period.

Accordingly, when the ratio of the maximum amplitude in the first period to the maximum amplitude in the second period is greater than a predetermined level, it may be determined that a tap motion has been detected. The present invention may determine the occurrence of a tap on the basis of the pattern of the sensor (110) output signal.

Figure 7:
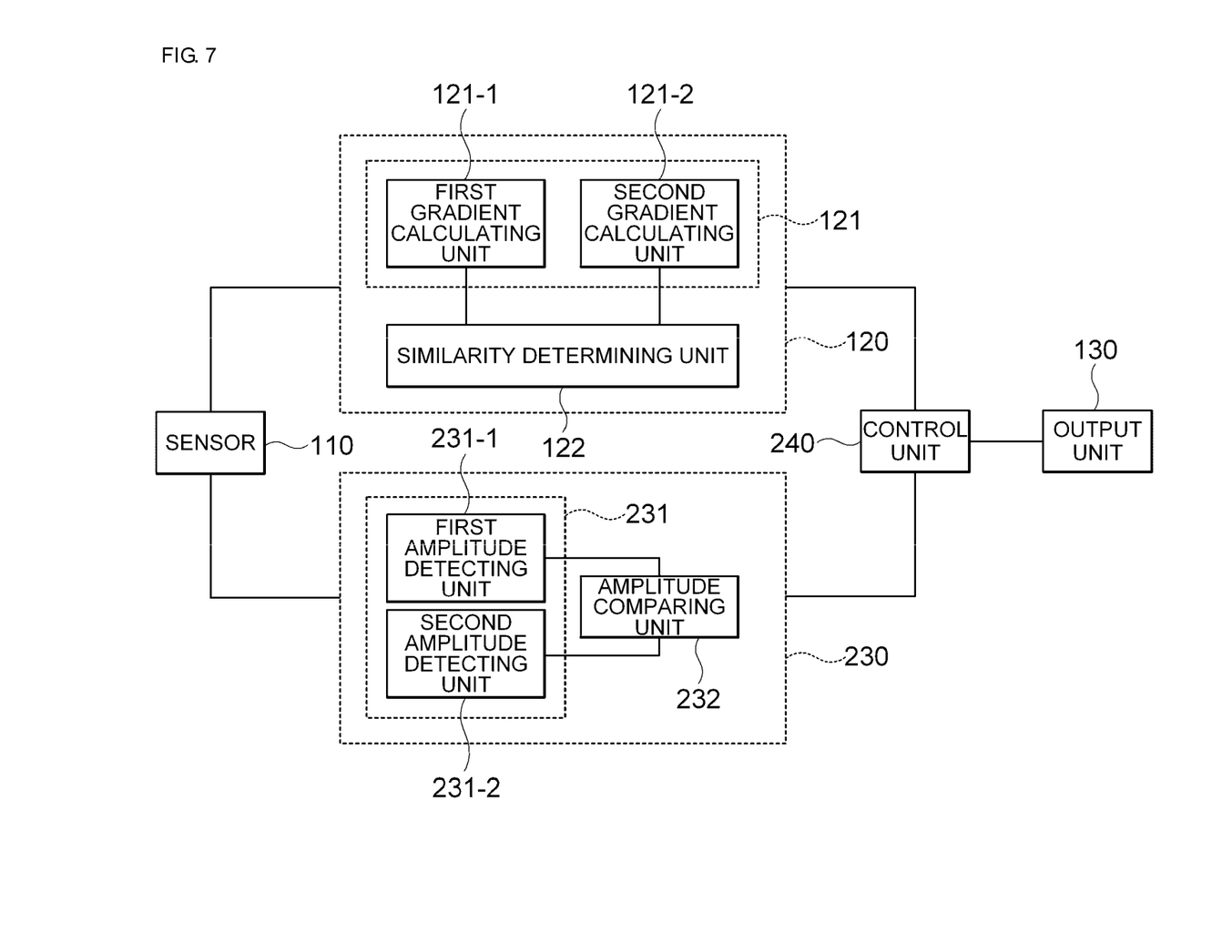
FIG. 7 is a diagram illustrating a tap detecting apparatus according to another exemplary embodiment of the present invention.

FIG. 7 is a diagram illustrating a tap detecting apparatus according to another exemplary embodiment of the present invention.

Referring to FIG. 7, a tap detecting apparatus according to another exemplary embodiment of the present invention may include a sensor 110, an amplitude detecting unit 231, an amplitude comparing unit 232, a control unit 240, and an output unit 130.

The sensor 110 detects a motion outside a device or a motion of a device and generates and outputs a signal corresponding to the detected motion. The sensor 110 may be implemented using various inertia sensors.

The amplitude detecting unit 231 may detect the amplitude of an output signal from the sensor 110.

The amplitude detecting unit 231 may include a first amplitude detecting unit 231-1 and a second amplitude detecting unit 231-2.

The first amplitude detecting unit 231-1 may detect the maximum amplitude of the sensor output signal in the first period, and the second amplitude detecting unit 231-2 may detect the maximum amplitude of the sensor output signal in the second period subsequent to the first period.

The amplitude comparing unit 232 determines whether the ratio of a first amplitude detected by the first amplitude detecting unit 231-1 to a second amplitude detected by the second amplitude detecting unit 231-2 is greater than or equal to a predetermined reference value, and outputs the determination result to the control unit 240.

The reference value compared with the ratio of the first amplitude to the second amplitude may depend on the characteristics of the sensor 110. For example, when the attenuation rate of the sensor output is great, because the ratio of the first amplitude to the second amplitude is great, the reference value may be set to be great. On the other hand, when the attenuation rate of the sensor output is small, because the ratio of the first amplitude to the second amplitude is small, the reference value may be set to be small.

The control unit 240 determines the detection of a tap according to the comparison result outputted from the amplitude comparing unit 232.

FIG. 7 illustrates an exemplary case where the gradient calculating unit 121 and the similarity determining unit 122 are disposed between the sensor 110 and the control unit 240.

When the tap detecting apparatus includes both the gradient calculating unit 121 and the similarity determining unit 122 as illustrated in FIG. 7, the accuracy of tap determination may be improved.

In this case, the control unit 240 may determine the detection of a tap in due consideration of the determination result of the similarity determining unit 122 and the comparison result of the amplitude comparing unit 232.

Also, only when the similarity determining unit 122 determines that the first gradient and the second gradient are similar to each other, the first amplitude and the second amplitude may be additionally compared to determine the detection of a tap.

When the similarity determining unit 122 determines that the first gradient and the second gradient are similar to each other, the tap detecting apparatus determines the double of a relevant duration as a first period, determines a duration subsequent to the first period as a second period, and detects the first amplitude and the second amplitude. This may further improve the accuracy of tap determination.

Figure 8:
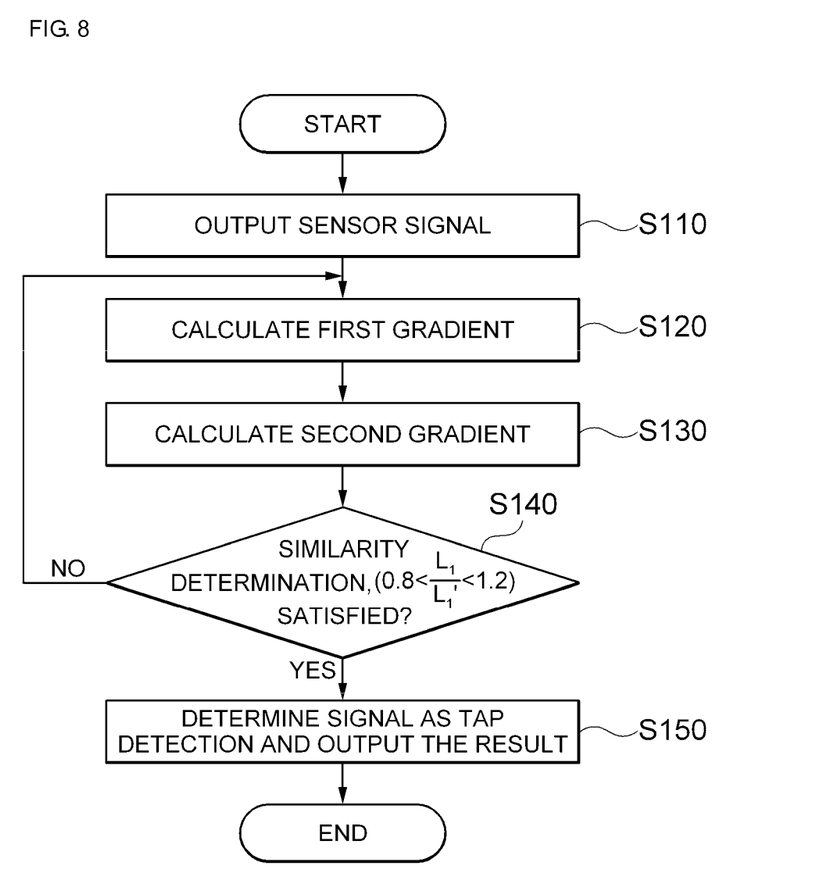
FIG. 8 is a flowchart illustrating a tap detecting method according to an exemplary embodiment of the present invention.

FIG. 8 is a flowchart illustrating a tap detecting method according to an exemplary embodiment of the present invention.

Referring to FIG. 8, a tap detecting method according to an exemplary embodiment of the present invention calculates the gradient of an output signal from a sensor 110, determines the similarity between the rising gradient and the falling gradient of the sensor output signal, and determines the detection of a tap when the rising gradient and the falling gradient are similar to each other.

First, the sensor 110 detects a motion and outputs a signal corresponding to the motion (S110).

Thereafter, the rising gradient and the falling gradient of the sensor output signal are calculated (S120 and S130). Herein, the rising gradient may be defined as a first gradient, and the falling gradient may be defined as a second gradient. A method of calculating the gradient of the sensor output signal is the same as that described above, and thus a description thereof will be omitted for conciseness.

Thereafter, the similarity between the first gradient and the second gradient is determined (S140). When the first gradient is $L_1$ and the second gradient is $L_1'$, the similarity determining step may determine whether $L_1/L_1'$ ranges between 0.8 and 1.2.

Thereafter, when the first gradient and the second gradient are determined to be similar to each other, the tap detecting method determines that a tap has been detected, and outputs the result (S150).

Figure 9:
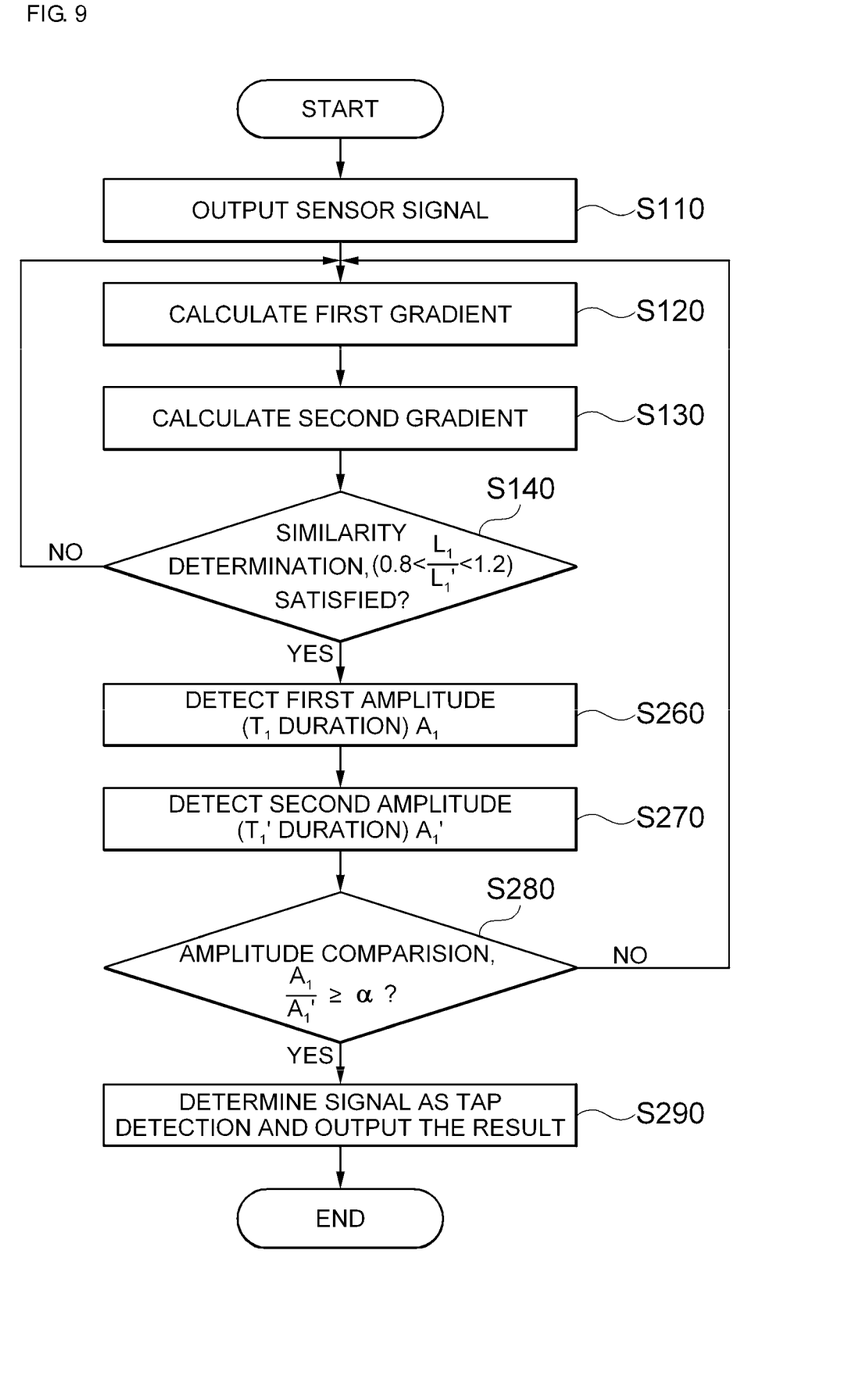
FIG. 9 is a flowchart illustrating a tap detecting method according to another exemplary embodiment of the present invention.

FIG. 9 is a flowchart illustrating a tap detecting method according to another exemplary embodiment of the present invention.

Referring to FIG. 9, a tap detecting method according to another exemplary embodiment of the present invention further includes an amplitude comparing step in addition to a similarity determining step (S140).

When it is determined in the similarity determining step (S140) that the first gradient and the second gradient are similar to each other, a first amplitude is detected (S260) and a second amplitude is detected (S270). Herein, the first amplitude may be defined as the maximum amplitude of a sensor output signal in a first period, and the second amplitude may be defined as the maximum amplitude of the sensor output signal in a second period subsequent to the first period.

When it is determined in the similarity determining step (S140) that the first gradient and the second gradient are similar to each other, the tap detecting method determines the double of a relevant duration as a first period, determines a duration subsequent to the first period as a second period, and detects the first amplitude and the second amplitude. This may further improve the accuracy of tap determination.

Thereafter, when the ratio of the first amplitude to the second amplitude is greater than or equal to a predetermined reference value (S280), the tap detecting method determines that a tap has been detected, and outputs the result (S290).

As described above, the present invention can detect a tap by using the characteristics of a tap signal, thereby making it possible to improve the accuracy of tap determination as compared with the conventional tap detecting method that uses a fixed reference value.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. An apparatus for detecting a tap, which comprises:
a sensor configured to detect a motion and output a signal corresponding to the motion;
a gradient calculating unit connected to the sensor to calculate a gradient of the output signal from the sensor;
a similarity determining unit connected to the gradient calculating unit to determine a similarity between a rising gradient and a falling gradient of a curve of the output signal;
a tap determining unit connected to the similarity determining unit to determine detection of a tap according to the determination result of the similarity determining unit; and
an output unit configured to output the determination result of the tap determining unit.

2. The apparatus according to claim 1, wherein the gradient calculating unit comprises:
a first gradient calculating unit configured to calculate the rising gradient of the output signal; and
a second gradient calculating unit configured to calculate the falling gradient of the output signal.

3. The apparatus according to claim 2, wherein the similarity determining unit determines that a first gradient calculated by the first gradient calculating unit is similar to a second gradient calculated by the second gradient calculating unit when the ratio of the first gradient to the second gradient is greater than 0.8 and smaller than 1.2.

4. The apparatus according to claim 1, wherein the gradient calculating unit calculates an average value by cumulatively summing the difference (Diff) values between the signals outputted from the sensor.

5. The apparatus according to claim 4, wherein the gradient calculating unit calculates the $(n+1)^{th}$ difference value ($\text{Diff}_{n+1}$) according to an equation $\text{Diff}_{n+1} = d_{n+1} - d_n$ where n is a nonnegative integer, and calculates the average value by cumulatively summing the results according to an equation $$\left(\sum_{n=0}^{N-1} \text{Diff}_{n+1}\right) / N.$$

6. The apparatus according to claim 1, wherein the gradient calculating unit calculates the difference (Diff) values between the signals outputted from the sensor, and selects the maximum value among the calculated difference values.

7. The apparatus according to claim 1, wherein the gradient calculating unit calculates a gradient (L(t)) of the output signal at a certain time (t) according to an equation $$L(t) = \frac{d}{dt} S(t).$$

8. An apparatus for detecting a tap, which comprises:
a sensor configured to detect a motion and output a signal corresponding to the motion;
a gradient calculating unit connected to the sensor to calculate a gradient of the output signal from the sensor;
a similarity determining unit connected to the gradient calculating unit to determine a similarity between a rising gradient and a falling gradient of a curve of the output signal;
an amplitude detecting unit connected to the sensor to detect an amplitude of the output signal;
an amplitude comparing unit connected to the amplitude detecting unit to compare the maximum amplitude of the output signal in a first period and the maximum amplitude of the output signal in a second period subsequent to the first period; and
a control unit connected to the similarity determining unit and the amplitude comparing unit to determine detection of a tap.

9. The apparatus according to claim 8, wherein the gradient calculating unit comprises:
a first gradient calculating unit configured to calculate the rising gradient of the output signal; and
a second gradient calculating unit configured to calculate the falling gradient of the output signal.

10. The apparatus according to claim 9, wherein the similarity determining unit determines that a first gradient calculated by the first gradient calculating unit is similar to a second gradient calculated by the second gradient calculating unit when the ratio of the first gradient to the second gradient is greater than 0.8 and smaller than 1.2.

11. The apparatus according to claim 8, wherein the amplitude detecting unit comprises:
a first amplitude detecting unit configured to detect the maximum amplitude of the output signal in the first period; and
a second amplitude detecting unit configured to detect the maximum amplitude of the output signal in the second period subsequent to the first period.

12. The apparatus according to claim 11, wherein the amplitude comparing unit determines whether the ratio of a first amplitude detected by the first amplitude detecting unit to a second amplitude detected by the second amplitude detecting unit is greater or equal to a predetermined reference value, and outputs the determination result.

13. The apparatus according to claim 8, wherein only when the similarity determining unit determines that the rising gradient and the falling gradient are similar to each other, the control unit determines detection of a tap according to the comparison result of the amplitude comparing unit.

14. An apparatus for detecting a tap, which comprises:
a sensor configured to detect a motion and output a signal corresponding to the motion;
a gradient calculating unit connected to the sensor to calculate a gradient of the output signal from the sensor;
a similarity determining unit configured to determine a similarity between a rising gradient and a falling gradient of a curve of the output signal;
an amplitude detecting unit connected to the sensor to detect amplitudes of the output signal;
an amplitude comparing unit connected to the amplitude detecting unit to compare the detected amplitudes; and
a control unit connected to the similarity determining unit and the amplitude comparing unit to determine detection of a tap,
wherein the control unit determines the double of a duration, in which the similarity determining unit determines that the rising gradient and the falling gradient are similar to each other, as a first period, determines a duration subsequent to the first period as a second period, controls the amplitude comparing unit to determine whether the ratio of the maximum amplitude of the output signal in the first period to the maximum amplitude of the output signal in the second period is greater than or equal to a predetermined reference value, and determines detection of a tap according to the determination result of the amplitude comparing unit.

15. A method for detecting a tap, which comprises:
detecting a motion and outputting a signal corresponding to the motion;
calculating a rising gradient and a falling gradient of the output signal;
determining a similarity between the rising gradient and the falling gradient of the output signal; and
when the rising gradient and the falling gradient are similar to each other, determining detection of a tap and outputting the result.

16. The method according to claim 15, wherein the determining of the similarity between the rising gradient and the falling gradient of the output signal determines that the rising gradient and the falling gradient are similar to each other when the ratio of the rising gradient to the falling gradient is greater than 0.8 and smaller than 1.2.

17. The method according to claim 15, wherein the calculating of the rising gradient and the falling gradient of the output signal calculates an average value by cumulatively summing the difference (Diff) values between the signals outputted from the sensor.

18. The method according to claim 17, wherein the calculating of the rising gradient and the falling gradient of the output signal calculates the $(n+1)^{th}$ difference value $(Diff_{n+1})$ according to an equation $Diff_{n+1} = d_{n+1} - d_n$ where n is a non-negative integer, and calculates the average value by cumulatively summing the results according to an equation $$\left(\sum_{n=0}^{N-1} Diff_{n+1}\right) / N.$$

19. The method according to claim 15, wherein the calculating of the rising gradient and the falling gradient of the output signal calculates the difference (Diff) values between the signals outputted from the sensor, and selects the maximum value among the calculated difference values.

20. The method according to claim 15, wherein the calculating of the rising gradient and the falling gradient of the output signal calculates a gradient $(L(t))$ of the output signal at a certain time (t) according to an equation $$L(t) = \frac{d}{dt} S(t).$$

21. A method for detecting a tap, which comprises:
detecting a motion and outputting a signal corresponding to the motion;
calculating a rising gradient and a falling gradient of the output signal;
determining a similarity between the rising gradient and the falling gradient of the output signal;
determining the double of a duration, in which the rising gradient and the falling gradient are determined to be similar to each other, as a first period, and determining a duration subsequent to the first period as a second period;
comparing the ratio of the maximum amplitude of the output signal in the first period to the maximum amplitude of the output signal in the second period with a predetermined reference value; and
when the ratio of the maximum amplitude of the output signal in the first period to the maximum amplitude of the output signal in the second period is greater than or equal to the predetermined reference value, determining detection of a tap and outputting the result.

* * * * *